US012793872B2

(12) United States Patent
Sohn et al.

(10) Patent No.: US 12,793,872 B2
(45) Date of Patent: Nov. 10, 2026

(54) MAGNETORHEOLOGICAL DAMPER

(71) Applicants: Hyundai Motor Company, Seoul (KR); Kia Corporation, Seoul (KR); SUNY Korea Research and Business Development Foundation, Incheon (KR)

(72) Inventors: Youngil Sohn, Yongin-si (KR); Min Jun Kim, Busan (KR); Jun Ho Seong, Seoul (KR); Sehyun Chang, Suwon-si (KR); Woo Keun Park, Seongnam-si (KR); Seung Bok Choi, Incheon (KR); Byung-Hyuk Kang, Incheon (KR); Bo Gyu Kim, Incheon (KR)

(73) Assignees: Hyundai Motor Company, Seoul (KR); Kia Corporation, Seoul (KR); SUNY Korea Research and Business Development Foundation, Seoul (KR)

( * ) Notice: Subject to any disclaimer, the term of this patent is extended or adjusted under 35 U.S.C. 154(b) by 408 days.

(21) Appl. No.: 18/529,265

(22) Filed: Dec. 5, 2023

(65) Prior Publication Data

US 2025/0054666 A1 Feb. 13, 2025

(30) Foreign Application Priority Data

Aug. 9, 2023 (KR) ........................ 10-2023-0104035

(51) Int. Cl.
*H01F 1/44* (2006.01)
*F16F 9/53* (2006.01)
(Continued)

(52) U.S. Cl.
CPC .............. *H01F 1/447* (2013.01); *F16F 9/535* (2013.01); *H01F 7/081* (2013.01); *H01F 27/24* (2013.01); *H01F 27/325* (2013.01)

(58) Field of Classification Search
CPC .......... H01F 1/447; H01F 7/081; H01F 27/24; H01F 27/325; F16F 9/535; F16F 9/53; F16F 2222/06; F16F 2224/045; F16F 2226/04
See application file for complete search history.

(56) References Cited

U.S. PATENT DOCUMENTS

| | | | | |
|---|---|---|---|---|
| 6,095,295 | A * | 8/2000 | Park | F16F 9/535 188/267.2 |
| 8,424,656 | B2 | 4/2013 | Hiemenz et al. | |
| 2021/0215222 | A1 | 7/2021 | Battlogg | |

FOREIGN PATENT DOCUMENTS

| | | |
|---|---|---|
| CN | 104728341 A | 6/2015 |
| CN | 105570374 A | 5/2016 |

(Continued)

OTHER PUBLICATIONS

Chinese Patent No. CN 112923001 to Wang published on Jun. 8, 2021.*

(Continued)

*Primary Examiner* — Pamela Rodriguez
(74) *Attorney, Agent, or Firm* — Slater Matsil, LLP

(57) ABSTRACT

An embodiment magnetorheological (MR) damper includes a stator including a solenoid coil to which a current is applicable, a rotor configured to rotate with respect to the stator, and an orifice disposed between the stator and the rotor, wherein the orifice is configured to allow fluids sealed in a first chamber and a second chamber defined by the stator and the rotor to communicate with each other.

20 Claims, 6 Drawing Sheets

(51) Int. Cl.

| | |
|---|---|
| ***H01F 7/08*** | (2006.01) |
| ***H01F 27/24*** | (2006.01) |
| ***H01F 27/32*** | (2006.01) |

(56) References Cited

FOREIGN PATENT DOCUMENTS

| | | | |
|---|---|---|---|
| JP | 2020508422 | A | 3/2020 |
| KR | 101984633 | B1 | 5/2019 |
| KR | 20220129190 | A | 9/2022 |

OTHER PUBLICATIONS

Korean Patent No. KR 102290869 to Ahn et al. published on Aug. 20, 2021.*

Giorgetti, A., et al., "Design and Testing of a MRF Rotational Damper for Vehicle Applications," Smart Materials and Structures, vol. 19, Issue 6, Article ID. 065006, IOP Publishing, Apr. 30, 2010, 8 pages.

Peng, Z., et al., "Magnetorheological Semi-Active Suspension System for a Tracked Vehicle," Applied Mechanics and Materials, ISSN: 1662-7482, vol. 482, Dec. 19, 2013, 5 pages.

Rakhio, A., et al., "Design and Testing of a Novel Vane Type Magnetorheological Damper," Recent Advances in Intelligent Manufacturing: First International Conference on Intelligent Manufacturing and Internet of Things and 5th International Conference on Computing for Sustainable Energy and Environment, IMIOT and ICSEE, Sep. 21-23, 2018, 10 pages.

Yang, L., et al., "A Rotary Magnetorheological Damper for a Tracked Vehicle," Advanced Materials Research vols. 328-330, Trans Tech Publications, Switzerland, Sep. 2, 2011, 5 pages.

Zhang, J. Q., et al., "Optimization Analysis of a New Vane MRF Damper," 11th Conference on Electrorheological Fluids and Magnetorheological Suspensions, Journal of Physics: Conference Series, vol. 149, IOP Publishing, 2009, 5 pages.

* cited by examiner

MAGNETORHEOLOGICAL DAMPER

CROSS-REFERENCE TO RELATED APPLICATIONS

This application claims the benefit of Korean Patent Application No. 10-2023-0104035, filed on Aug. 9, 2023, which application is hereby incorporated herein by reference.

TECHNICAL FIELD

The present disclosure relates to a magnetorheological (MR) damper.

BACKGROUND

A damper for a vehicle reacts to the relative speed of a sprung mass and an unsprung mass of the vehicle to generate a damping force, which is a force resisting the relative motion between the sprung mass and the unsprung mass. The damper for a vehicle may be classified into a linear damper and a rotary damper. Currently, the linear damper is widely used.

A vibration system has a resonance determined by the mass and the stiffness of the system, and the amplitude of the resonance is determined by damping. In other words, in a system with large damping, the amplitude at a resonance point is small, whereas in a system with small damping, the amplitude at a resonance point is very large.

The resonance of a vehicle body is usually at a frequency of 1 to 1.5 Hertz (Hz), and the resonance of a vehicle wheel is usually at a frequency of 10 to 15 Hz. The frequency band between the two resonances (1 to 10 Hz) usually corresponds to a band in which humans are very sensitive to the vertical acceleration excitation. When damping in the corresponding frequency band is small, the ride quality is good, and when damping in the corresponding frequency band is large, the ride quality is poor. As a system that provides good riding comfort in the sensitive frequency band has small damping, the system has a large amplitude at the resonance frequency of the vehicle body. The ride quality in the frequency band of 1 to 10 Hz and the amplitude at the resonance frequency of the vehicle body are inversely proportional to each other, having a trade-off relationship.

To compensate such a feature, a variable damping system has been developed. The variable damping system may be classified into two types. One of them is a system configured to control the opening of an orifice using a solenoid or a motor. In this system, the opening of the orifice should be controlled through precise position control, so the system needs a precise micro-position control system. The system uses a method of precisely controlling the position of a spool using a motor or a solenoid valve to adjust the opening of the orifice.

The other type of the variable damping system adjusts damping by changing the characteristics of a fluid using electricity or magnetism. Generally, in changing the characteristics of a fluid, magnetism is used, and a magnetorheological (MR) damper using magnetism is close to practical use as being adopted in many vehicles recently. The MR damper has an orifice through which a fluid flows and has mounted therein an MR coil and an MR core configured to apply a magnetic field around the orifice.

The above information disclosed in this background section is only for enhancement of understanding of the background of embodiments of the present disclosure, and therefore it may contain information that does not form the related art that is already known to a person of ordinary skill in the art.

Korean Patent Publication No. 10-2022-0129190 (Sep. 23, 2022) may provide information related to the technical field of the present disclosure.

SUMMARY

Embodiments of the present disclosure can solve problems associated with the related art, and an embodiment of the present disclosure provides an improved MR damper that has a greater efficiency in implementing a damping force for a given volume thereof.

Another embodiment of the present disclosure provides an MR damper capable of efficiently generating a magnetic field.

A further embodiment of the present disclosure provides an MR damper having a reduced frictional force.

The embodiments of the present disclosure are not limited to the foregoing, and other embodiments not mentioned herein will be clearly understood by those of ordinary skill in the art to which the present disclosure pertains (hereinafter, "those skilled in the art") based on the description below.

The features of embodiments of the present disclosure to perform characteristic functions of the embodiments of the present disclosure to be described later are as follows.

One embodiment of the present disclosure provides an MR damper including a stator including a solenoid coil to which current is applicable, a rotor configured to rotate with respect to the stator, and an orifice formed between the stator and the rotor, the orifice configured to allow fluids sealed in a first chamber and a second chamber defined by the stator and the rotor to communicate with each other.

Another embodiment of the present disclosure provides a method of assembling a stator for an MR damper, the stator having an outer MR core including a first element and a second element, the method including winding a solenoid coil around a bobbin, mounting the second element into the bobbin having the solenoid coil wound therearound, and mounting the bobbin having the second element mounted thereinto to the first element.

Other aspects and preferred embodiments of the present disclosure are discussed infra.

It is to be understood that the term "vehicle" or "vehicular" or other similar terms as used herein are inclusive of motor vehicles in general, such as passenger automobiles including sport utility vehicles (SUVs), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The above and other features of embodiments of the present disclosure are discussed infra.

BRIEF DESCRIPTION OF THE DRAWINGS

The above and other features of embodiments of the present disclosure will now be described in detail with reference to certain exemplary embodiments thereof illustrated in the accompanying drawings which are given hereinbelow by way of illustration only, and thus are not limitative of the embodiments of the present disclosure, and wherein.

Figure 1:
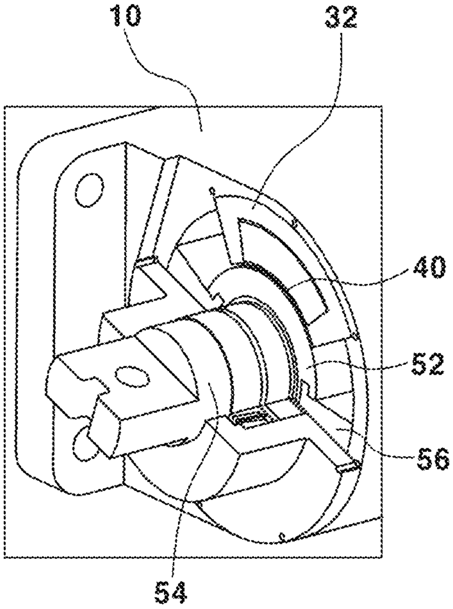
FIGS. 1 and 2 illustrate a magnetorheological (MR) damper according to an embodiment of the present disclosure.

It should be understood that the appended drawings are not necessarily to scale, presenting a somewhat simplified representation of various preferred features illustrative of the basic principles of embodiments of the present disclosure. The specific design features of embodiments of the present disclosure, including, for example, specific dimensions, orientations, locations, and shapes, will be determined in part by the particular intended application and usage environment.

In the figures, the reference numbers refer to the same or equivalent parts of the present disclosure throughout the several figures of the drawings.

DETAILED DESCRIPTION OF ILLUSTRATIVE EMBODIMENTS

Descriptions of specific structures or functions presented in the embodiments of the present disclosure are merely exemplary for the purpose of explaining concepts according to the embodiments of the present disclosure, and the embodiments may be implemented in various forms. In addition, the descriptions should not be construed as being limited to the embodiments described herein, and should be understood to include all modifications, equivalents, and substitutes falling within the idea and scope of the embodiments of the present disclosure.

Meanwhile, in the present disclosure, terms such as "first" and/or "second" may be used to describe various components, but the components are not limited by the terms. These terms are only used to distinguish one component from another. For example, a first component could be termed a second component, and similarly, a second component could be termed a first component, without departing from the scope of exemplary embodiments of the present disclosure.

It should be understood that, when a component is referred to as being "connected to" another component, the component may be directly connected to the other component, or intervening components may also be present. In contrast, when a component is referred to as being "directly connected to" another component, there is no intervening component present. Other terms used to describe relationships between components should be interpreted in a like fashion (e.g., "between" versus "directly between," "adjacent" versus "directly adjacent," etc.).

Throughout the specification, like reference numerals indicate like components. The terminology used herein is for the purpose of illustrating embodiments and is not intended to limit the present disclosure. In this specification, the singular form includes the plural sense, unless specified otherwise. The terms "comprises" and/or "comprising" used in this specification mean that the cited component, step, operation, and/or element does not exclude the presence or addition of one or more of other components, steps, operations, and/or elements.

Hereinafter, embodiments of the present disclosure will be described in detail with reference to the accompanying drawings.

A general linear MR damper has an upper chamber and a lower chamber divided by a piston, and the piston has an orifice formed therein. When the piston moves, a pressure difference is generated between the two chambers, allowing an MR fluid to flow through the orifice. Here, a magnetic field is applied, and then fine particles present in the MR fluid are aligned in a line by the magnetic field, generating a flow of fluid and varying a damping force.

A rotary MR damper includes a stator portion and a rotor portion. As an example, the stator portion may have an annular or cylindrical orifice formed therein, and a solenoid coil may be disposed around the orifice. As another example, an orifice may be formed in a portion where the stator portion and the rotor portion, serving as a shaft, move with respect to each other, and a solenoid coil may be provided as an elongated annular core.

The former case has several problems. For instance, a frictional force may be generated by the relative motion between the stator portion and the rotor portion. Also, the structure thereof is complicated as the orifice, the solenoid coil, and the MR core are disposed inside the stator portion, and the number of structures for generating a required damping force is increased. In the latter case, the portion between the stator portion and the rotor portion where the stator portion and the rotor portion move relative to each other forms the orifice, but due to the solenoid coil having the shape of the elongated annular core, a magnetic field may not be efficiently generated and the number of structures to generate a required damping force may be increased.

For this reason, embodiments of the present disclosure provide an improved MR damper having a simplified structure, having a greater efficiency in implementing a damping force for a given volume thereof, and capable of efficiently generating a magnetic field.

Figure 2:
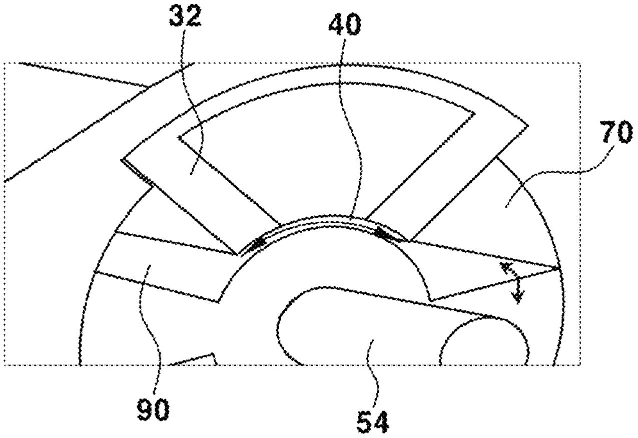

As illustrated in FIGS. 1 and 2, the MR damper according to embodiments of the present disclosure is of the rotary type. The MR damper includes a stator 30 and a rotor 50. The stator 30 and the rotor 50 are accommodated in a housing 10. The stator 30 is fixed to the housing 10, and the rotor 50 is rotatably mounted within the housing 10.

The housing 10 seals therein an MR fluid. The MR fluid may flow as the rotor 50 rotates. An orifice 40 through which the MR fluid moves is defined between the stator 30 and the rotor 50. Specifically, when the rotor 50 rotates, the MR fluid may flow between a first chamber 70 and a second chamber 90 through the orifice 40. The first chamber 70 and the second chamber 90 are divided by the stator 30 and the rotor 50.

Figure 3:
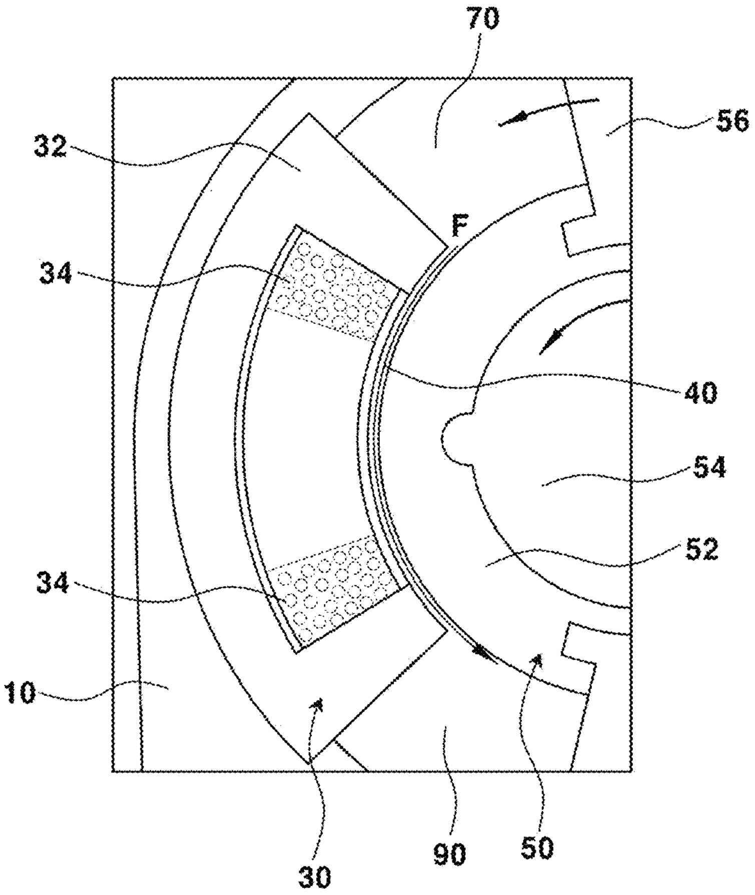
FIG. 3 is a cross-sectional view of an MR damper according to an embodiment of the present disclosure.
Figure 4A:
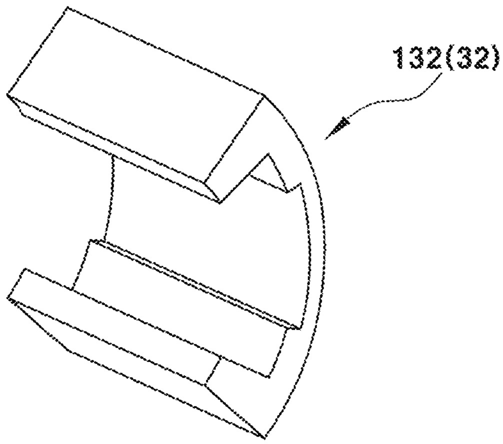
FIG. 4A is a perspective view of a first element of an outer MR core of an MR damper according to an embodiment of the present disclosure.
Figure 4B:
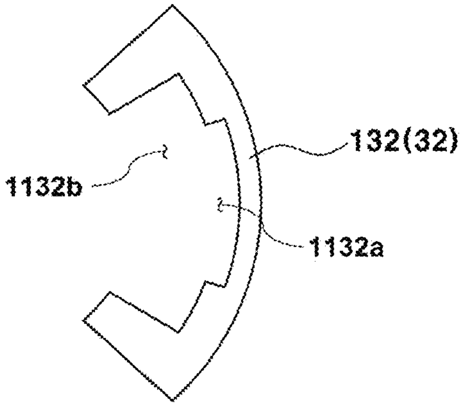
FIG. 4B is a cross-sectional view of a first element of an outer MR core of an MR damper according to an embodiment of the present disclosure.
Figure 5A:
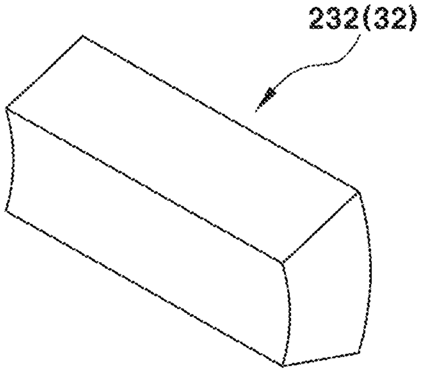
FIG. 5A is a perspective view of a second element of an outer MR core of an MR damper according to an embodiment of the present disclosure.
Figure 5B:
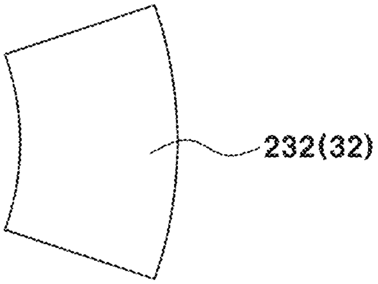
FIG. 5B is a cross-sectional view of a second element of an outer MR core of an MR damper according to an embodiment of the present disclosure.

As illustrated in FIG. 3, according to embodiments of the present disclosure, the MR damper includes at least two MR cores 32, 52. The stator 30 and the rotor 50 each may include an MR core. In one implementation, the stator 30 includes an outer MR core 32, and the rotor 50 includes an inner MR core 52.

Referring to FIGS. 4A, 4B, 5A, and 5B, according to an implementation of embodiments of the present disclosure, the outer MR core 32 includes a first element 132 and a second element 232. In some implementations, the second element 232 may be integrated with the first element 132 but may have a space from the first element 132. The space may have mounted therein a bobbin 36 around which a solenoid coil 34 is wound. In some implementations, the second element 232 may be separated from the first element 132 and be inserted into the first element 132. Furthermore, the bobbin 36 around which the solenoid coil 34 is wound may be mounted between the first element 132 and the second element 232. Because the outer MR core 32 has an almost "E" shape, the outer MR core 32 may form two magnetic field loops together with the inner MR core 52, improving the efficiency in generating a magnetic field compared to the related art and implementing a greater damping force for a given volume thereof.

The first element 132 may have a first receiving portion 1132*a* and a second receiving portion 1132*b* formed therein. The first receiving portion 1132*a* and the second receiving portion 1132*b* may have a groove shape. The first receiving portion 1132*a* may have a depth greater than that of the second receiving portion 1132*b*. In one implementation, the second element 232 may be inserted into the first receiving portion 1132*a*. The bobbin 36 around which the solenoid coil 34 is wound may be mounted on the second element 232.

Referring back to FIG. 3 again, the stator 30 has the solenoid coil 34 mounted therein. The solenoid coil 34 is configured to allow current to be applied thereto. When current is applied to the solenoid coil 34, a magnetic field may be formed around the solenoid coil 34. The strength of the applied current, the timing, and the period of the application of the current may be adjusted.

Figure 6A:
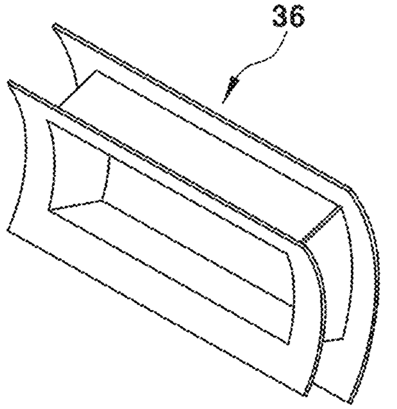
FIG. 6A is a perspective view of a bobbin for an MR damper according to an embodiment of the present disclosure.
Figure 6B:
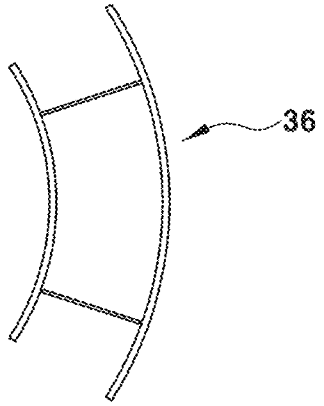
FIG. 6B is a cross-sectional view of a bobbin for an MR damper according to an embodiment of the present disclosure.

The solenoid coil 34 may be wound within the outer MR core 32. In one implementation, as illustrated in FIGS. 6A and 6B, the solenoid coil 34 is wound around the bobbin 36, which is an insulator, and is mounted inside the outer MR core 32. In one implementation, the second element 232 may be inserted into the bobbin 36 around which the solenoid coil 34 is wound, and the first element 132 may be mounted to the external side of the bobbin 36. Here, the bobbin 36 may be seated in the second receiving portion 1132*b*.

Figure 7:
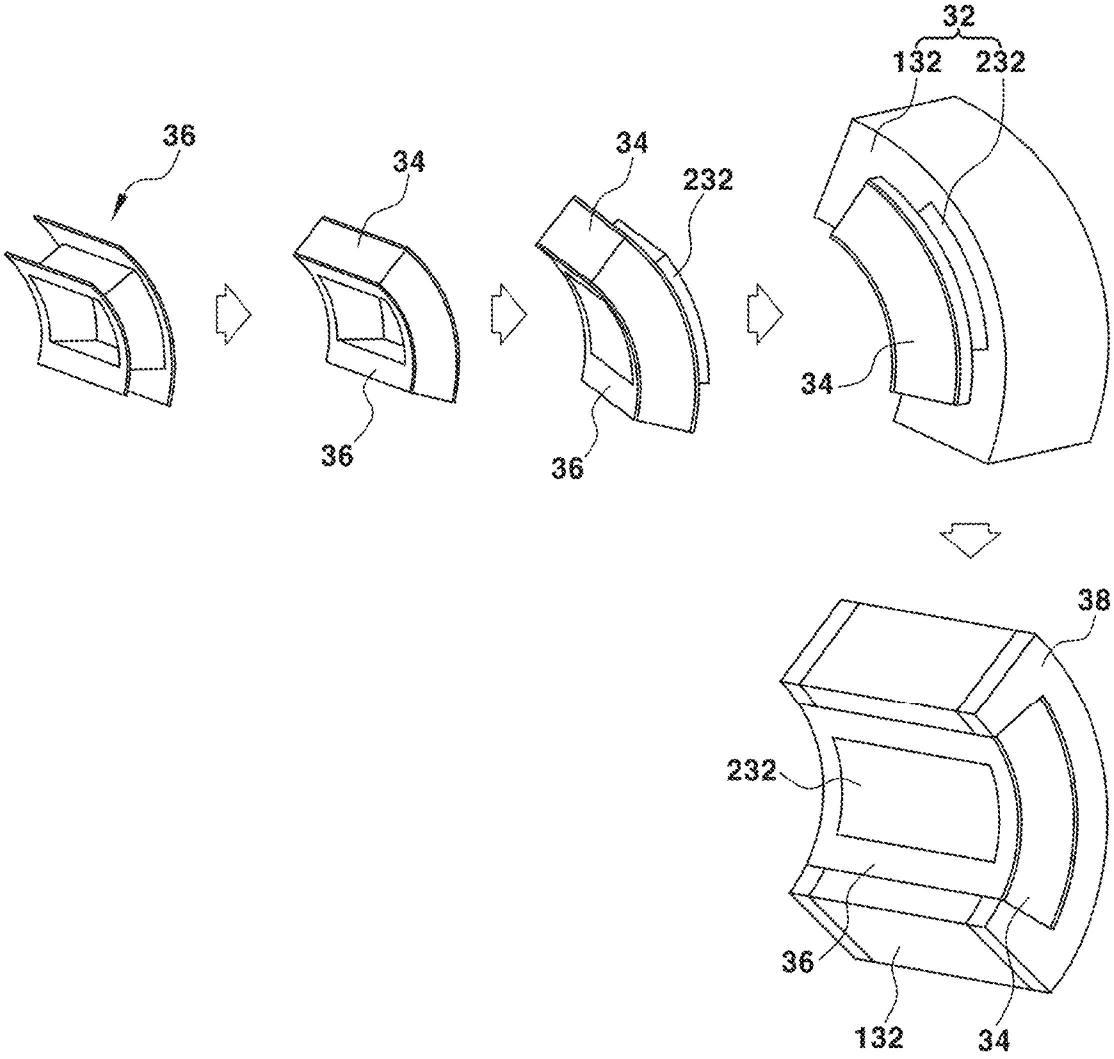
FIG. 7 illustrates an assembly process of an outer MR core for an MR damper according to an embodiment of the present disclosure.
Figure 8:
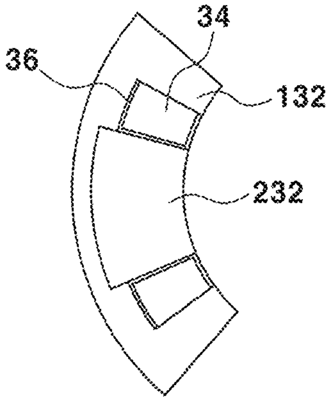
FIG. 8 is a cross-sectional view of the outer MR core of FIG. 7 assembled.

Referring to FIGS. 7 and 8, according to an implementation of embodiments of the present disclosure, the stator 30 may be assembled through a series of processes. The solenoid coil 34 is wound around the bobbin 36, which is an insulator. The second element 232 is inserted into the bobbin 36 around which the solenoid coil 34 is wound. The bobbin 36 into which the second element 232 is inserted is inserted into the first element 132. The second element 232 is mated with the first receiving portion 1132*a*, and the bobbin 36 around which the solenoid coil 34 is wound is seated in the second receiving portion 1132*b*. In some implementations, side blocks 38 may be mounted to each side of the first element 132.

Continuing to refer to FIG. 3, the rotor 50 is rotatable within the housing 10. The inner MR core 52 of the rotor 50 is disposed at an inner side of the stator 30. The inner MR core 52 has a shaft 54 of the rotor 50 mounted therein. The inner MR core 52 also has vanes 56 mounted thereto.

In one implementation, the vanes 56 may be provided at opposite sides of the stator 30, respectively, with the stator 30 interposed therebetween. Therefore, the first chamber 70 is arranged between any one of the vanes 56 and the stator 30. The second chamber 90 is arranged between the other one of the vanes 56 and the stator 30. The chambers 70, 90 and the vanes 56 may be disposed in the circumferential direction of the MR damper.

As the rotational motion of the shaft 54 is converted to the motion of the vanes 56, the pressure in the two chambers 70, 90, each disposed between the stator 30 and the vanes 56, may change. Accordingly, the MR fluid may flow from the first chamber 70 at a high pressure to the second chamber 90 at a low pressure in a flow direction F. Herein, although the first chamber 70 is described as a high-pressure chamber and the second chamber 90 as a low-pressure chamber, it should be understood that this is merely for clarity of explanation and that the two are interchangeable.

As described above, the orifice 40 is formed between the stator 30 and the rotor 50. Particularly, the orifice 40 may be provided between the stator 30 and the rotor 50 at a radially inner side of the stator 30 or a radially outer side of the rotor 50. Therefore, according to embodiments of the present disclosure, a frictional force that may be generated between the stator 30 and the rotor 50 may be minimized.

Figure 9:
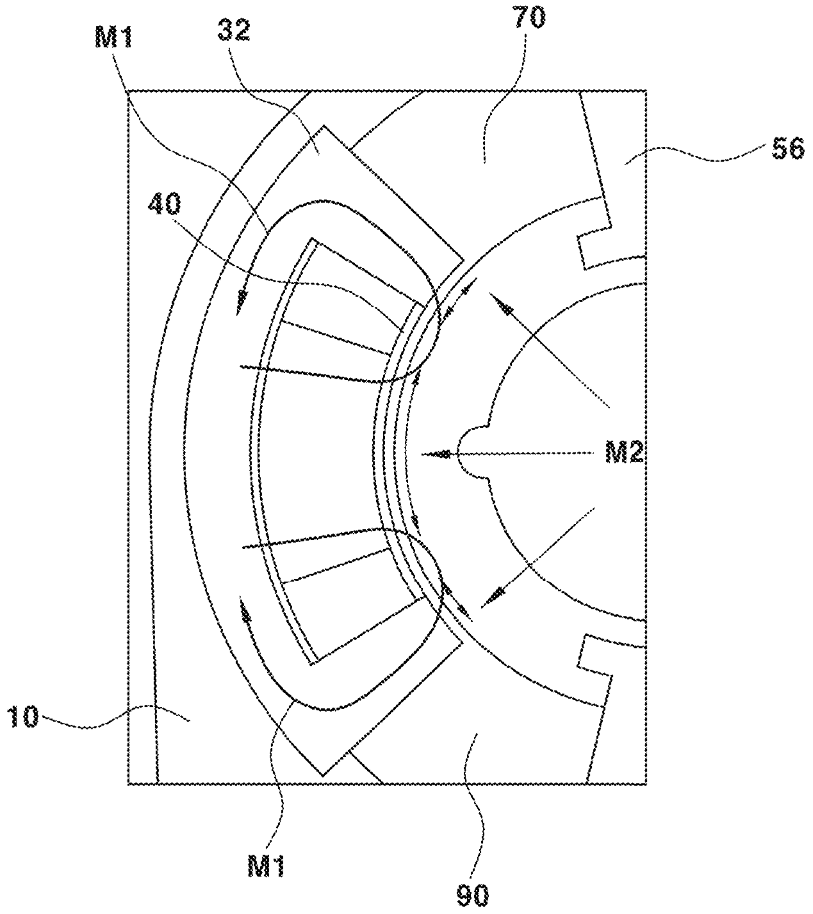
FIG. 9 is a cross-sectional view of an MR damper according to an embodiment of the present disclosure.

Referring to FIG. 9, the MR damper according to embodiments of the present disclosure may more efficiently generate a magnetic field compared to the related art and may improve the efficiency in implementing a damping force for a given volume thereof. According to embodiments of the present disclosure, the core is a flat core. The magnetic field may be generated around the solenoid coil 34 as indicated by M1 and may act on the orifice 40 as indicated by M2. Accordingly, an area where the magnetic field may act is broadened, whereby the MR damper according to embodiments of the present disclosure may improve the efficiency of generating a magnetic field while having a simplified structure and may improve the efficiency of implementing a damping force for a given volume thereof.

As is apparent from the above description, embodiments of the present disclosure can provide the following effects.

According to embodiments of the present disclosure, provided is an MR damper that has a greater efficiency in implementing a damping force for a given volume thereof.

Moreover, embodiments of the present disclosure propose an MR damper capable of efficiently generating a magnetic field using a flat core having an "E" shape.

Furthermore, embodiments of the present disclosure provide an MR damper having an orifice formed between a stator and a rotor to reduce a frictional force.

Effects of embodiments of the present disclosure are not limited to what has been described above, and other effects not mentioned herein will be clearly recognized by those skilled in the art based on the above description.

It will be apparent to those of ordinary skill in the art to which the present disclosure pertains that the embodiments of the present disclosure described above are not limited by the above-described embodiments and the accompanying drawings, and various substitutions, modifications, and changes are possible within a range that does not depart from the technical idea of the embodiments of the present disclosure.

What is claimed is:

1. A magnetorheological (MR) damper comprising:
a stator comprising a solenoid coil to which a current is applicable, wherein the stator further comprises an outer MR core;
a rotor configured to rotate with respect to the stator; and
an orifice disposed between the stator and the rotor, wherein the orifice is configured to allow fluids sealed in a first chamber and a second chamber defined by the stator and the rotor to communicate with each other;
wherein the outer MR core comprises:
a first core element; and
a second core element provided in the first core element by forming a space from the first core element, wherein the first core element comprises a first receiving portion recessed into the first core element and having the second core element seated therein.

2. The MR damper of claim 1, wherein the solenoid coil is wound within the outer MR core.

3. The MR damper of claim 2, wherein the second core element is integrated with or separated from the first core element.

4. The MR damper of claim 2, wherein the solenoid coil is mounted in the space.

5. The MR damper of claim 2, further comprising a bobbin disposed in the space, wherein the solenoid coil is wound around the bobbin.

6. The MR damper of claim 2, wherein the first core element further comprises a second receiving portion recessed into the first core element at a depth smaller than that of the first receiving portion and having the solenoid coil seated therein.

7. The MR damper of claim 2, further comprising a housing configured to receive therein the stator and the rotor and to seal therein the fluids, wherein the stator is fixed to the housing and the rotor is rotatable within the housing.

8. The MR damper of claim 1, wherein the rotor comprises:
a shaft; and
at least two vanes spaced apart from each other and connected to the shaft, wherein the stator is interposed between the at least two vanes.

9. The MR damper of claim 8, wherein the rotor further comprises an inner MR core disposed to surround the shaft and coupled to the vanes.

10. The MR damper of claim 8, wherein:
the first chamber is disposed between a first vane of the at least two vanes and the stator; and
the second chamber is disposed between a second vane of the at least two vanes and the stator.

11. The MR damper of claim 1, further comprising a housing configured to receive therein the stator and the rotor and to seal therein the fluids, wherein the stator is fixed to the housing and the rotor is rotatable within the housing.

12. The MR damper of claim 1, wherein:
the solenoid coil is wound within the outer MR core;
the rotor comprises an inner MR core; and
the orifice is defined between the outer MR core and the inner MR core.

13. A method of assembling a stator for a magnetorheological (MR) damper, the stator comprising an outer MR core comprising a first core element and a second core element, the method comprising:
winding a solenoid coil around a bobbin;
mounting the second core element into the bobbin having the solenoid coil wound therearound, wherein the second core element is provided in the first core element by forming a space from the first core element, and wherein the first core element comprises a first receiving portion recessed into the first core element and having the second core element seated therein; and
mounting the bobbin having the second core element mounted thereinto to the first core element.

14. The method of claim 13, further comprising mounting side blocks to opposite sides of the first core element, respectively.

15. The method of claim 13, wherein mounting the bobbin having the second core element mounted thereinto to the first core element comprises:
seating the second core element in the first receiving portion disposed in the first core element; and
seating the bobbin having the second core element mounted thereinto in a second receiving portion disposed in the first core element.

16. A method of providing a magnetorheological (MR) damper, the method comprising:
forming a stator comprising a solenoid coil to which a current is applicable and an outer MR core that comprises a first core element and a second core element provided in the first core element by forming a space from the first core element, wherein the first core element comprises a first receiving portion recessed into the first core element and having the second core element seated therein;
forming a rotor configured to rotate with respect to the stator; and
forming an orifice between the stator and the rotor, wherein the orifice allows fluids sealed in a first chamber and a second chamber defined by the stator and the rotor to communicate with each other.

17. The method of claim 16, wherein the solenoid coil is wound within the outer MR core.

18. The method of claim 16, wherein the rotor comprises:
a shaft; and
at least two vanes spaced apart from each other and connected to the shaft, wherein the stator is interposed between the at least two vanes.

19. The method of claim 18, wherein:
the first chamber is disposed between a first vane of the at least two vanes and the stator; and
the second chamber is disposed between a second vane of the at least two vanes and the stator.

20. The method of claim 16, wherein:
the solenoid coil is wound within the outer MR core;
the rotor comprises an inner MR core; and
the orifice is formed between the outer MR core and the inner MR core.

* * * * *